(12) United States Patent
Vakkilainen et al.

(10) Patent No.: US 8,337,762 B2
(45) Date of Patent: Dec. 25, 2012

(54) SUBSTRATE HAVING POROUS SHEET(S) FOR TREATING EXHAUST GASES OF COMBUSTION ENGINES

(75) Inventors: Aulis Vakkilainen, Vihtavuori (FI); Reijo Lylykangas, Vihtavuori (FI); Ritva Heikkinen, Kiiminki (FI); Teuvo Maunula, Oulu (FI); Matti Harkonen, Oulu (FI); Ari Lievonen, Vaajakoski (FI)

(73) Assignee: Ecocat Oy, Vihtavuori (FI)

( * ) Notice: Subject to any disclaimer, the term of this patent is extended or adjusted under 35 U.S.C. 154(b) by 0 days.

(21) Appl. No.: 13/109,514

(22) Filed: May 17, 2011

(65) Prior Publication Data

US 2011/0217215 A1 Sep. 8, 2011

Related U.S. Application Data

(63) Continuation of application No. 10/553,179, filed as application No. PCT/FI2004/050041 on Apr. 19, 2004, now abandoned.

(30) Foreign Application Priority Data

Apr. 17, 2003 (FI) .................................. 20035047

(51) Int. Cl.
*B01D 50/00* (2006.01)
*B21D 51/16* (2006.01)

(52) U.S. Cl. .......................................... 422/177; 29/890
(58) Field of Classification Search .................. 422/177, 422/180
See application file for complete search history.

(56) References Cited

U.S. PATENT DOCUMENTS

| | | | |
|---|---|---|---|
| 4,293,447 A | 10/1981 | Inaba et al. |
| 4,348,362 A | 9/1982 | Foss |
| 5,997,829 A | 12/1999 | Sekine et al. |
| 6,534,022 B1 | 3/2003 | Carlborg et al. |
| 2002/0141912 A1 | 10/2002 | Murrell et al. |

FOREIGN PATENT DOCUMENTS

| | | |
|---|---|---|
| EP | 298943 A2 | 1/1989 |
| EP | 1 384 508 A1 | 1/2004 |
| JP | 60-32919 | 2/1985 |
| JP | 04279714 A | 10/1992 |
| JP | 2003/120255 A | 4/2003 |
| WO | WO 97/00119 A1 | 1/1997 |
| WO | WO 03/038248 A1 | 5/2003 |

*Primary Examiner* — Tom Duong
(74) *Attorney, Agent, or Firm* — Buchanan Ingersoll & Rooney PC

(57) ABSTRACT

The object of the invention is a porous sheet(s) for treating exhaust gases of combustion engines in open channels. According to the invention at least part of the porous sheet has a covering support having pores over 10 nm and coarse particles over 1.4 µm.

11 Claims, 7 Drawing Sheets

SUBSTRATE HAVING POROUS SHEET(S) FOR TREATING EXHAUST GASES OF COMBUSTION ENGINES

The present invention relates to a substrate having said porous sheet(s). The present invention also relates to methods for manufacturing said substrate having said porous sheet(s).

BACKGROUND OF THE INVENTION

For the treatment of exhaust gases of combustion engines substrates having open or closed channels or combinations of those is used. In open channels the exhaust gas is directly flowing through the substrate. In substrate having closed channels exhaust gas is forced to flow through walls, e.g. through ceramic or metallic porous walls. In open channels reduction of gaseous impurities is often high but the reduction of impurity particles is low, e.g. from 10 to 15%. In closed channels the reduction of gaseous impurities is high and also the reduction of impurity particles is high, e.g. from 70 to 90%. The problem in closed channels is the clogging of walls. Closed channels will gradually wholly clog if it is not cleaned. Pressure loss will also increase. One way to keep the channels open is to clean them continuously or periodically.

One difficult situation is the starting the combustion engine using substrate having closed channels, which are partially clogged. The temperature of the said substrate is low in starting and particles are trapping on the surfaces. Eventually there are so many particles on surfaces of the walls that the fluid of exhaust gas is inhibited. In this situation it is possible that even the combustion engine can damage.

WO 03038248 A1 (published 8.5.2003) disclose a filter composite whereby a fluid can flow through the filter composite. It comprises at least one top layer made of an at least partially porous material with at least one edge area and comprises at least one fibrous layer made of a fibrous cloth. The filter composite is characterized in that at least one fibrous layer forms an enclosure that encloses the fibrous layer so that the fibrous layer is permanently arranged inside the at least one top layer.

DISCLOSURE OF THE INVENTION

Accordingly a substrate having a porous sheet that efficiency reduces particles of exhaust gas in open channels has now been invented.

For this purpose, the invention is characterized in facts presented in the independent claims. Some preferable embodiments of the invention are disclosed in other claims.

The surface of the sheet of the invention can intentionally be rough, thus promoting mass and heat transfer and/or particle removal/reactions. Roughness is provided for instance with rough starting materials such as with 30-100 μm fibers and/or coating methods. Roughness, support thickness and/or the number of catalytically active layers can preferably vary in axial direction of one or more of the catalysts.

Constructional embodiments of the invention are not limited in any way. According to an embodiment of the invention, the catalyst of the invention can be present in several structures assembled parallel or in series with respect to the flow direction.

According to an embodiment of the invention a porous sheet is at least partially covered with a support having pores over 10 nm and coarse particles over 1.4 μm. Preferably essentially all pores of the porous sheet have been filled with said support. Preferably there are open channels with both sizes of said porous sheet. There is no need to use any additional layers, e.g. fibrous layers, as a support and/or as a filter device. The structure of coated porous sheet is simply, they are easy to manufacture and the reduction of particles is high compared e.g. smooth sheet used in open channels.

It has been surprisingly discovered that when covering the porous sheet with a support having pores over 10 nm and coarse particles over 1.4 μm the reduction of particles flowing in open channels is essentially improved. The reduction of particles is very much depending on the particle soarce and composition of particles. Particles can include various amount Volatile Organic Compounds (VOF's), solid carbon, sulfur, water and metal oxides. A standard oxidation catalyst can oxidize majority VOF's and reduce this way 10 to 60% of particle mass. With the new invention it is possible to improve particle reduction by 20 to 25%.

An important character of new porous sheet is that it is not clogging at all or the clogging is minimal. This is very important and the porous sheet according to the invention can be used in most demanding conditions and they useful in many applications.

The gas flow in open channel is reduced on the surface the porous sheet due to pores and coarse particles of the support. Porous sheet coated with material having pores coarse particles acts as an effect open particle trap. This adds contacts of impurity gases and particles thus adding retention time and reduction of impurities. Impurity particles are also more often attached to porous sheet compared to smooth sheet.

The particles attached to porous sheet break down to gaseous impurities, which further decompose to harmless compounds. Part of gas can flow through pores of support in openings of porous sheet and particles attach on surfaces of support. Also this leads to better reduction of particles. On the other hand the porous sheet do not clog or the clogging is minimal and pressure loss and flow rate of gas are not reduced near the porous sheet. This reduces failure in operation thus adding efficiency of the porous sheet(s).

Pressure difference between sides of the porous sheet adds flowing of exhaust gas through pores of the porous sheet and the support. This phenomenon leads to attachments of particles on support and better reduction of particles from exhaust gas.

According to an embodiment of the invention median pore size of said support is over 5 nm, preferably from 10 to 50 nm, such as from 15 to 20 nm. Optimal pore size of the support also depends on exhaust gases and circumstances of gas flow near porous sheet. Exhaust gases can have e.g. median particle size from 5 to 200 nm and median pore size can e.g. be from 5 to 20 nm.

Porous sheet can be preferably mesh sheet or metal foam sheet, sintered metal sheet, knitted wire mesh, ceramic fiber sheet etc. According to an embodiment of the invention the porous sheet is a mesh sheet. Preferably the mesh number of the mesh sheet is from 30 to 300. At least part of exhaust gas can flow through the support having pores over 10 nm in the openings of mesh sheets. This leads to attachment of particles of exhaust gas to the surfaces of support giving essentially better reduction of particles.

According to an embodiment of the invention the median opening size of mesh sheet is from 0.01 to 0.5 nm, preferably from 0.05 to 0.3 nm, such as from 0.08 to 0.2 nm.

The shape of openings of porous sheet can vary. It can be canal-like, square-like, diamond-like or hole-like. E.g. in diamond-like mesh sheet the wires can be at one level or they can be crosswise.

Porous sheet can be e.g. corrugated or flat. Preferably said porous sheet is a corrugated sheet, such as corrugated mesh sheet. This adds contacts of impurity gases and particles with support thus adding retention time and reduction of impurities.

According to an embodiment of the invention said support comprises fibres, which are projecting out from the plane of said support. Also this adds reduction of particles by reducing flow rate of particles thus adding attachment of particles on support.

Rough support can be made e.g. by milling. Adding coarse particle fraction into the milling process remarkably changes the pore size distribution of the support. Rough support material can be made e.g. by milling wash coat slurry and coarse alumina particles together by ball mill for 30 to 120 minutes, e.g. 40 to 60 minutes.

According to an embodiment of the invention the median particle size of support is over 1 µm, preferably from 1.4 to 15 µm, such as from 2 to 10 µm. The value partly depends on median particle size of exhaust gases and flow rates of gases near surfaces of porous sheets. It also depends on pore size of the porous sheet(s). The area mass of coarse support can be e.g. 20 to 200 g/m$^2$, such as preferably 20 to 80 g/m$^2$, e.g. 35 to 50 g/m$^2$. The specific surface area of the support, measured by BET-method, can be e.g. from 30 to 300 m$^2$/g, such as preferably from 150 to 250 m$^2$/g, e.g. from 150 to 200 m$^2$/g.

Coarse particles can be e.g. alumina-, silica, zirconia-, ceria- or/and titania-particles. Also other particles suitable to exhaust gas treatment can be used. The most suitable particles can be e.g. coarse alumina particles that can easily been milled by ball milling. These selected alumina particles are round shaped as origin, thus the suitable effect for gas purification is maintained by milling. The original median particle size can be such as from 100 to 250 µm, e.g. from 150 to 200 µm, such as 170 µm.

According to an embodiment of the invention support comprises catalytically inert coarse alumina-, silica, zirconia-, ceria- or/and titania-particles. Preferably at least part of support has been made by milling catalytically active fine support material and catalytically inactive coarse particles together. Preferable said support comprises coarse material that is easy to mill.

According to an embodiment of the invention the pore volume is preferably from 0.3 to 0.8 cm$^3$/g, e.g. 0.4 cm$^3$/g.

According to an embodiment of the invention said support comprises catalytically active fine material.

According to an embodiment of the invention said support comprises catalytically inert coarse material.

Catalyst wash coats, prepared namely for oxidation purposes will be the most suitable ones. All thought any wash coat can be roughened by selected coarse particles. Typical oxidation wash coat is like in FIG. 8. The BET specific surface area can be e.g. 230 m$^2$/g, median particle size can be e.g. from 1.5 to 3.5 µm, area mass of the support can be e.g. 40 g/m$^2$.

According to an embodiment of the invention a substrate having open channels comprises at least one porous sheet according to the invention. Preferably said sheet is a corrugated sheet. More preferably said sheet is a corrugated mesh sheet. The substrate having said porous sheet(s) acts as an effect open particle trap and this adds the reduction of particles. On the other hand open channels of the substrate do not clog or the clogging is minimal and pressure loss in substrate and flow rate of gas are not reduced. This reduces failure in operation thus adding efficiency of the substrate.

Said substrate can comprise also other sheet(s) than porous sheet(s) according to the invention. Other sheet(s) can be e.g. flat, corrugated, smooth, perforated, mesh sheet, wire mesh sheet or fibrous sheet.

According to an embodiment of the invention the other sheet(s) is a corrugated sheet(s). Preferably said other sheet(s) is a corrugated mesh sheet(s). By using corrugated mesh sheet(s) as other sheet(s) retention time of particles is added and collision of particles is also added. These add reduction of particles thus improving the efficiency of the substrate.

According to an embodiment of the invention the other sheet(s) is a wire mesh sheet(s) By using wire mesh sheet(s) in substrate the reduction of particles can be improved by adding retention time of particles in said substrate.

According to an embodiment of the invention the other sheet(s) is a fibrous sheet(s) By using fibrous sheet(s) in substrate the reduction of particles can be improved by adding retention time of particles in said substrate.

According to an embodiment of the invention other sheet(s) has been at least partially covered with a support. That support can be same support used for porous sheet or it can be different support. Preferable support for other sheet comprises coarse particles and/or fibres, which are projecting out from the plane of said support. Preferably the support on the other sheet(s) has the median particle size over 0.4 µm, such as from 1.5 to 3.5 µm. This essentially adds the adhesion of particles thus improving the reduction of particles in said substrate According to an embodiment of the invention other sheet(s) has essentially covered with a support having the median particle size over 1.4 µm and/or having pores over 10 nm. This also improves reduction of impurity particles by adding attachment of particles to sheets.

According to an embodiment of the invention porous sheets and/or other sheet(s) have impressions and/or projections. This adds collision of gas and impurity particles to surfaces of the substrate thus adding reduction of particles. This leads to better reduction values of impurity particles of exhaust gas. Collision of gas also leads to better contact of gas with catalytically active material thus improving reduction of gaseous impurities.

Particles of exhaust gas of combustion engines be efficiently treated with substrate having porous sheet(s) according to the invention. The reduction of impurity particles is surprisingly high compared to traditional substrates. Also the reduction of gaseous impurities is high. The porous sheet(s) according to the invention does not clog or the clogging is minimal so that it does not have effect s on flowing rate of exhaust gas in substrate. Also pressure loss in substrate is minimal.

The substrate can e.g. be a pre-oxicatalyst or SCR-catalyst. It can also be a hydrolysis catalyst. The substrate can be preferably be used to purify impurity particles of exhaust gases of combustion engines. The structure of substrate can vary. It can be e.g. wound or stacked.

According to an embodiment of the invention, the catalyst is coated on one or several catalytic substrates made from metallic, ceramic, metal oxide, SiC and/or Si nitride material(s). The catalyst coating of the invention can be pre- or post-coated on normal ceramic or metallic cells or substrates where shapes of cells, such as a square, a triangle, cell density (10-2000 cpsi, cells per square inch, a term familiar to those skilled in the art), or wall thicknesses (10-500 µm), can vary widely according to the application. Very large channel sizes can be used in the catalyst (<100 cpsi) if the effluent gas contains high amounts of particles or sulfur compounds. In applications containing low amounts of particles and sulfur, very small channel sizes can be used in the cell (such as >500 cpsi). In diesel applications, a typical cell number is from 50 to 600 cpsi. The values of these variables can also vary within the cell, or in the next cells, this being advantageous due to efficient mixing, low pressure drop, or mechanical strength.

The cell to be coated can also serve as a kind of a statical mixing structure either having mixing zones (for instance bents, flow obstacles, or throttlings) in separate channels, or the structure being made by superimposing corrugated, curved foils or plates in a manner where the directions of wave crests deviate from that of the incoming gas, the wave crests of the superimposed plates being, respective, oriented in different directions. In a conventional metal cell, the wave crests of corrugated foils are parallel with one another, and with the main flow direction.

According to an embodiment of the invention, the substrate is coated on one or several cell-like, or porous structure(s). The channels thereof can be parallel with the flow direction and/or have a different orientation. According to another embodiment of the invention, the substrate is coated on one or several particle separating and/or mixing structure(s). According to an embodiment of the invention, the substrate is combined with a particle trap, or filter made of ceramic, metallic, metal oxide, $SiO_2$, SiC and/or Si nitride material(s).

Mixing efficiency can be controlled by altering the angle between the wave crest and the main flow direction. With the mixing structure, mixing of the flow is provided in radial direction of the pipe. With the mixing structure, higher separation rates for particles compared to normal cell structures are obtained. Also, the structure to be coated can partly or totally consist of a metal mesh, sintered porous metal, fiber, or a particle trap.

The catalyst of the invention can also be coated on two or several of the described catalyst structures located in series or parallel in flow direction. Catalyst structures of different, or of same sizes can be incorporated into a single catalyst converter, or they can be present in separate converters connected by necessary piping. The compositions of the catalysts of the invention, noble metal loads thereof (e.g. Pt), cell numbers (geometrical surface areas), or structures can be identical or different.

Latest diesel engines are typically provided with a turbo, and thus the temperatures in exhaust pipes are low, and there is no space very close to the engine for large converters. For this reason, the catalyst coatings of the invention can also be assembled in forms divided into smaller structures where the exhaust gas temperature is maximized for initiating reactions in the catalyst. Therefore, it is preferable to use for instance one or several small catalyst cell(s) or other structures (metal fiber, mixer) upstream of the turbo (preturbo catalyst) or immediately downstream thereof (precatalyst). The catalyst coating can also be situated at any point of the pathway of the exhaust gas, on the walls of piping or constructions (wings of the turbo, outlets from cylinders or from the turbo).

If an oxidation catalyst is necessary for downstream processing in addition to a particle separator, said particle separator can also be coated with the catalyst coating of the invention. In this way, a very compact structure is obtained. The particle separator can be made of ceramic, metallic, metal oxide, carbide (e.g. SiC), nitride material ($SiH_2$), nitride or a mixture thereof. The structure can be a cell-like particle trap or a rod-like structure where the gas flows through the holes on the walls, the particles being retained in the inlet side of the separator, in flow direction. Other particle separators include fiber-like, mesh-like, foamy or plate-like structures that can also be coated with the catalyst of the invention. In addition to particle separation, such structures can be used for cost reasons or due to low pressure drops caused by them.

According to an embodiment of the invention, the catalyst can be composed of several coated superimposed layers, at least one of which is a layer of the invention. The catalyst of the invention can be coated with another layer of the invention, the upper, or the surface layer being free of active metal. This protective layer can prevent the fully active metal from leaving from the catalyst, protect lower layers against deactivation, promote adsorption of particles to the surface, and/or alter electrical properties (electrical conductivity, charging, etc.) of the surface layer in comparison to the lower layer.

The catalyst can comprise e.g. Sc, Ti, Cr, Mn, Fe, Co, Cu, La, Au, Ag, Ga, In and/or Ce as catalytically active material.

The substrate can preferably have corrugated sheets stacked together having oblique angles relative to each other. Preferably the angle of profiles is from 5 to 30 degrees. They can be preferably be joined together at cross over points by resistance welding. In the open channels like this the mass and heat transfer are very high compared to straight channels.

The substrate can also be a wounded substrate having impressions and/or projections. This leads to swirling motion resulting better mass and heat transfer compared e.g. to straight channels.

Uneven flow rate in substrate can promote the reduction of particles on porous sheet(s) according to the invention by adding flowing of gas through pores of the support. This flowing is due to pressure differences between next to channels. Also impressions and depressions cause pressure differences in substrate thus adding gas flow through the porous sheets according to the invention. This phenomenon leads to attachments of particles on support and better reduction of particles from exhaust gas.

The substrate can be conical or tubular. The shape of substrate depends e.g. on engine and exhaust gas.

DETAILED DESCRIPTION OF THE INVENTION

Now some embodiments of the present invention will be described in more details with reference to the appended drawings.

Figure 1:
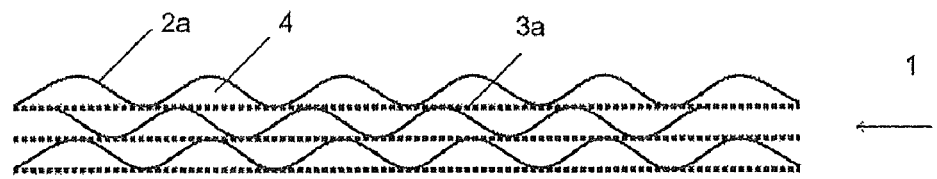
FIG. 1 shows a substrate having flat porous sheet and smooth corrugated other sheets.
Figure 2:
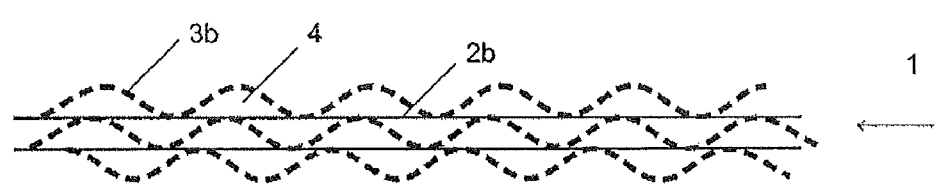
FIG. 2 shows a substrate having corrugated porous sheet and flat other sheet.
Figure 3:
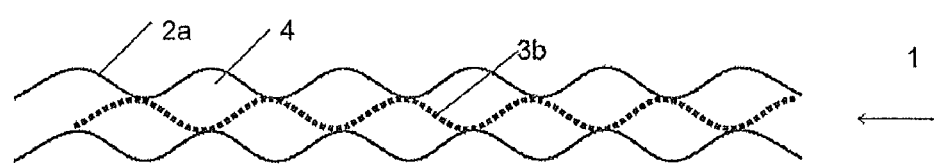
FIG. 3 shows a substrate having corrugated porous sheets and smooth corrugated other sheets.
Figure 4:
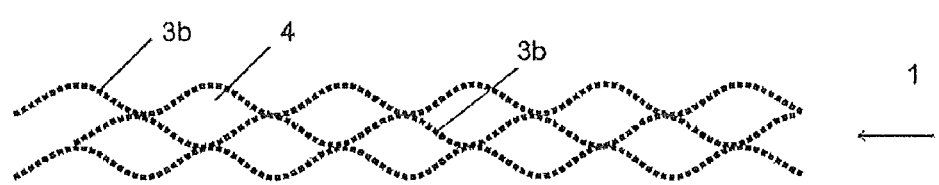
FIG. 4 shows a substrate having corrugated porous sheets joined together.
Figure 5:
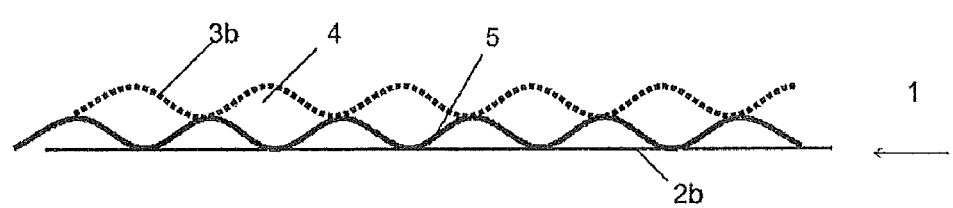
FIG. 5 shows a substrate having corrugated porous sheet, fibrous sheet and smooth other sheet.

In FIG. 1 substrate 1 comprises flat mesh sheets 3*a* and smooth corrugated other sheet 2*a* joined together so that there are open channels 4 between them. In FIG. 2 substrate 1 comprises corrugated mesh sheets 3*b* and smooth flat sheets 2b joined together so that there are open channels 4 between them. In FIG. 3 substrate 1 comprises corrugated mesh sheets 3b and smooth corrugated other sheet 2a joined together so that there are open channels 4 between them. In FIG. 4 substrate 1 comprises corrugated mesh sheets 3b, which are joined together so that there are open channels 4 between them. In FIG. 5 substrate 1 comprises corrugated mesh sheet 3b, wire mesh sheet 5 and smooth flat sheet 2b, which are joined together so that there are open channels 4 between them. In all these embodiments gas can flow through open channels and depending on pressure differences and fluid circumstances gas is also flowing through the sheets coated by coarse material according to the invention and particles of exhaust gas are attached to support. Particles are also attached to support due to collision with coarse particles and fibres. Preferably there are open channels with both sizes of said porous sheet.

Figure 6:
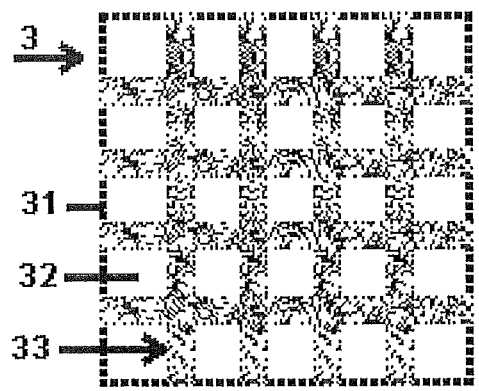
FIG. 6 shows a mesh sheet partially covered with a support having coarse particles and fibres.
Figure 7:
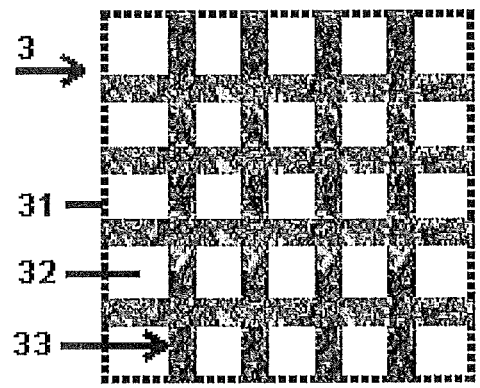
FIG. 7 shows a mesh sheet partially covered with a support having coarse particles.
Figure 8:
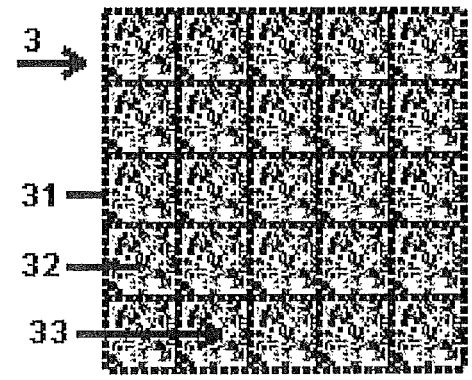
FIG. 8 shows a mesh sheet essentially covered with a coarse support.

In FIGS. 6 to 8 is shown a mesh sheet 3 having wires 31, which have square openings 32. In FIG. 6 the mesh sheet 3 is partially covered with support 33 having coarse particles and fibres. In FIG. 7 the mesh sheet 3 is partially covered with support 33 having coarse particles. In FIG. 8 the openings 32 of the mesh sheet 3 are essentially covered with support 33 having coarse particles.

These porous sheets are examples of the invention and show that there are many possibilities to product and use porous sheets according to the invention.

Figure 9:
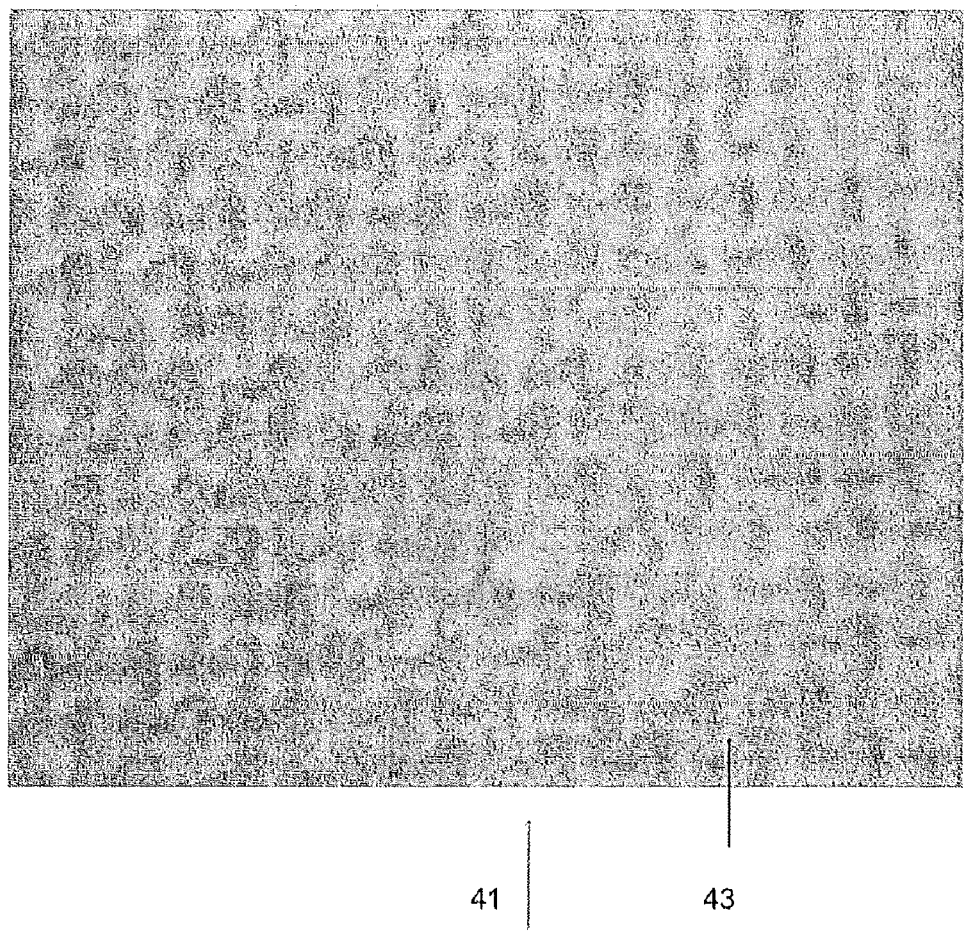
FIG. 9 shows a photo of a mesh sheet essentially covered with a coarse support.

FIG. 9 is a photo of a mesh sheet 41 covered with coarse support 43 having median particle size about 2 µm.

Figure 10:
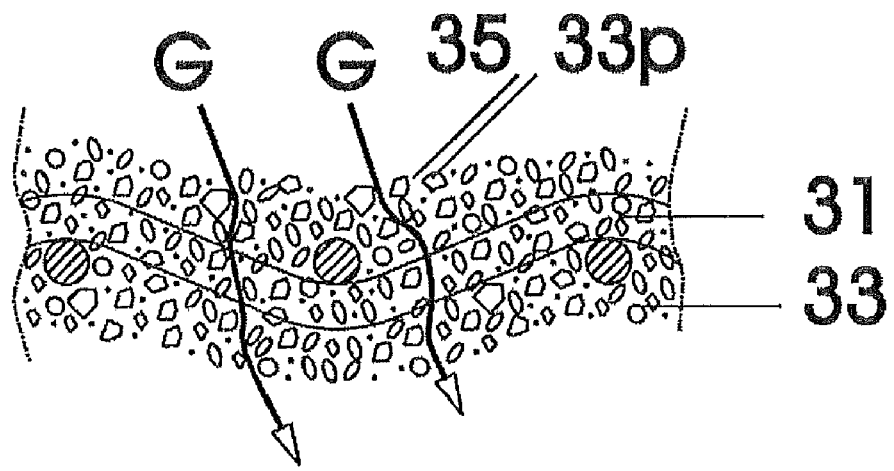
FIG. 10 shows cross-section of a mesh sheet.
Figure 11:
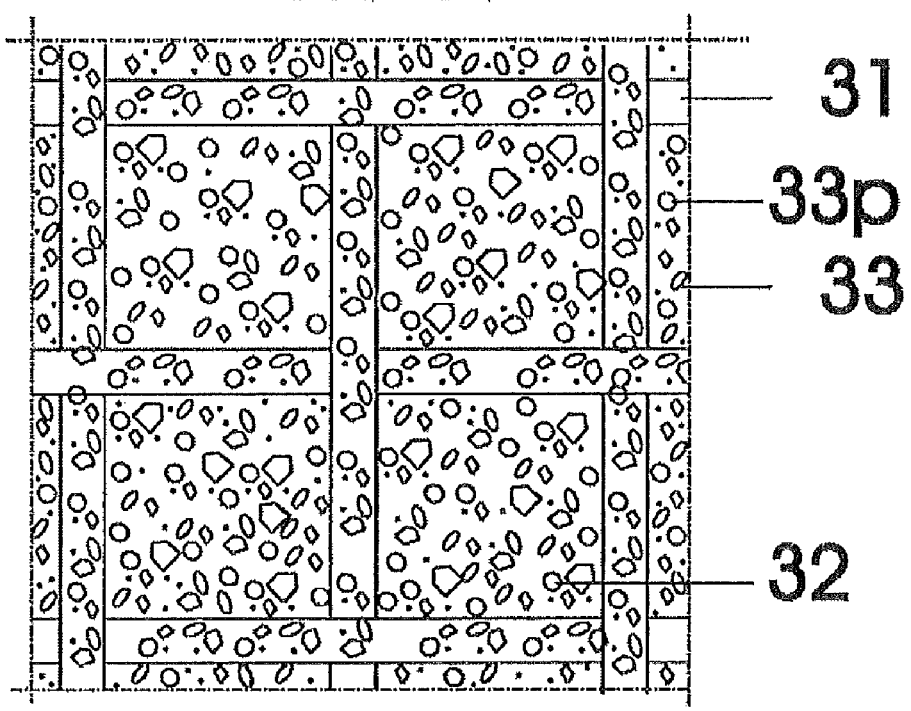
FIG. 11 shows surface section of a mesh sheet.

In FIGS. 10 and 11 mesh sheet 3 has been covered with a support 33 having fine 33f and coarse particles 33c. Coarse support essentially covers both wires 31 and openings 32 of the mesh sheet 3. Exhaust gas G can flow through the mesh sheet via pores 35 of the support 33. Particles of exhaust gas are preferably attached on surfaces of the support.

Figure 12:
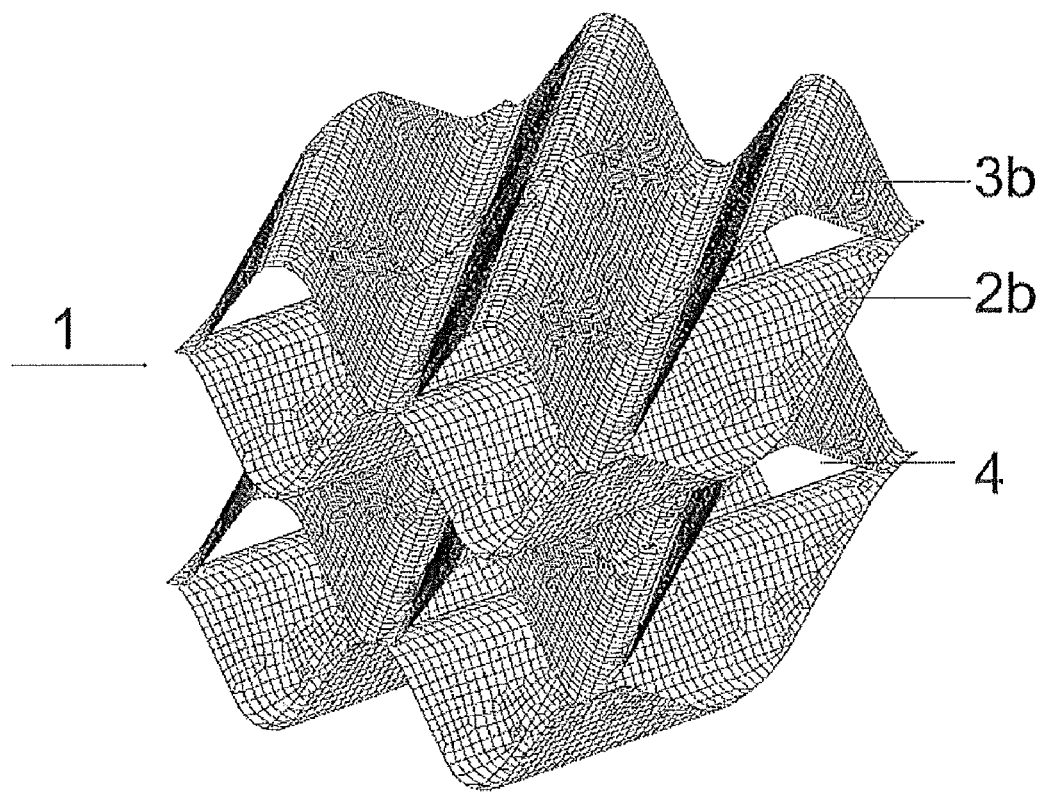
FIG. 12 shows a three dimensional picture of mesh sheets joined together.

In FIG. 12 substrate 1 has corrugated mesh sheets 3b joined together. These mesh sheets can be covered with a coarse support of the invention. Between these mesh sheets there are open channels 4 in said substrate 1 allowing open flowing of exhaust gas through said substrate 1. This embodiment is very preferably in deducing particles of the exhaust gas.

Figure 13:
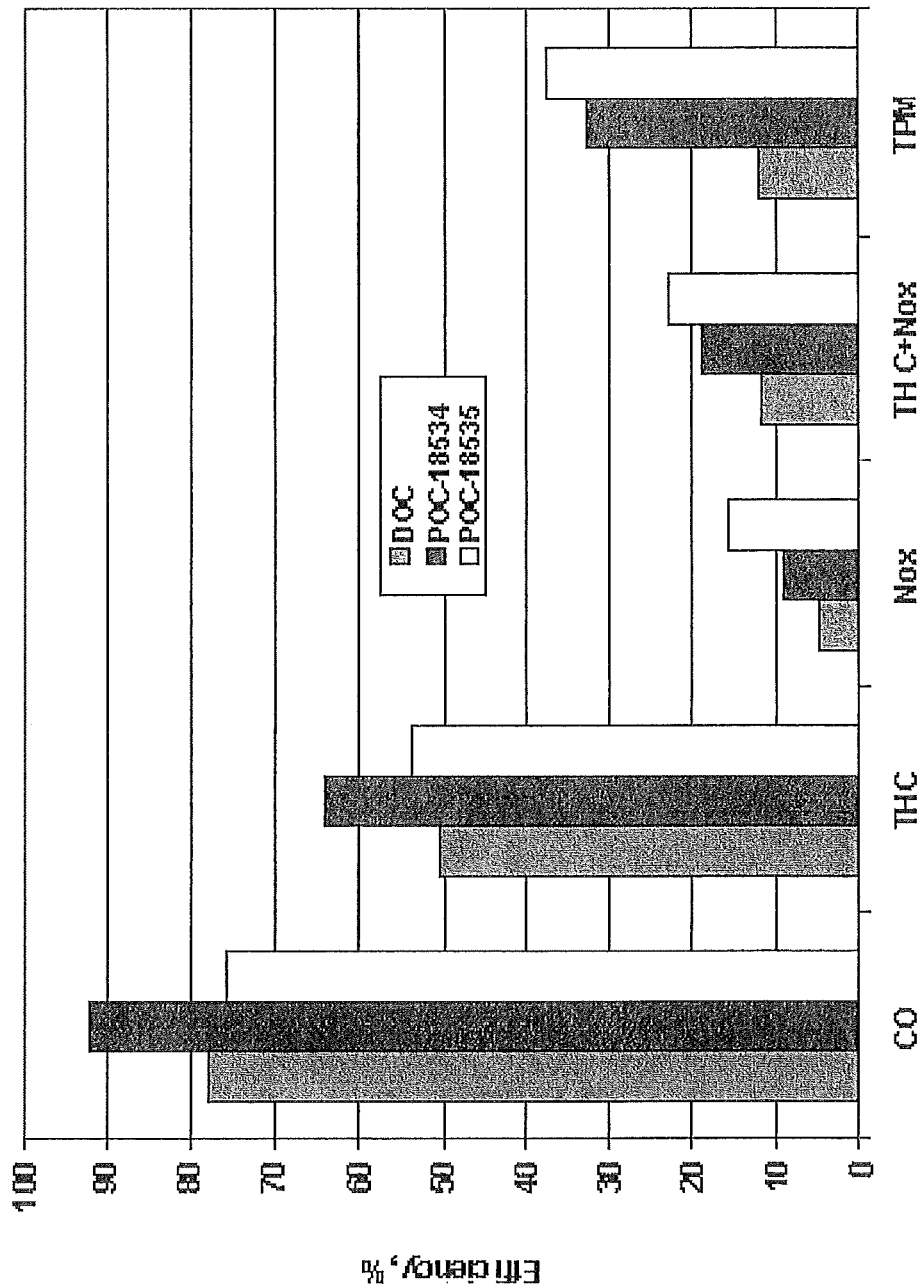
FIG. 13 shows test results with catalysts of prior art and of the invention.

In FIG. 13 is shown test results with prior an art catalyst and a catalysts according to the invention. Prior art conventional catalyst (DOC) has flat and corrugated smooth sheets rolled together and joined with needles. The support has median particle size about 1.0 µm and there were no coarse particles in it. The catalysts according to the invention (POC) had coarse support having median particle size 2 µm. POC-18534 had flat mesh sheet and smooth corrugated sheet rolled together and having impressions. POC-18535 had corrugated mesh sheets stacked together having oblique 20 degrees angles relative to each other. Mesh sheets were joined together at cross over points by resistance welding.

Figure 14:
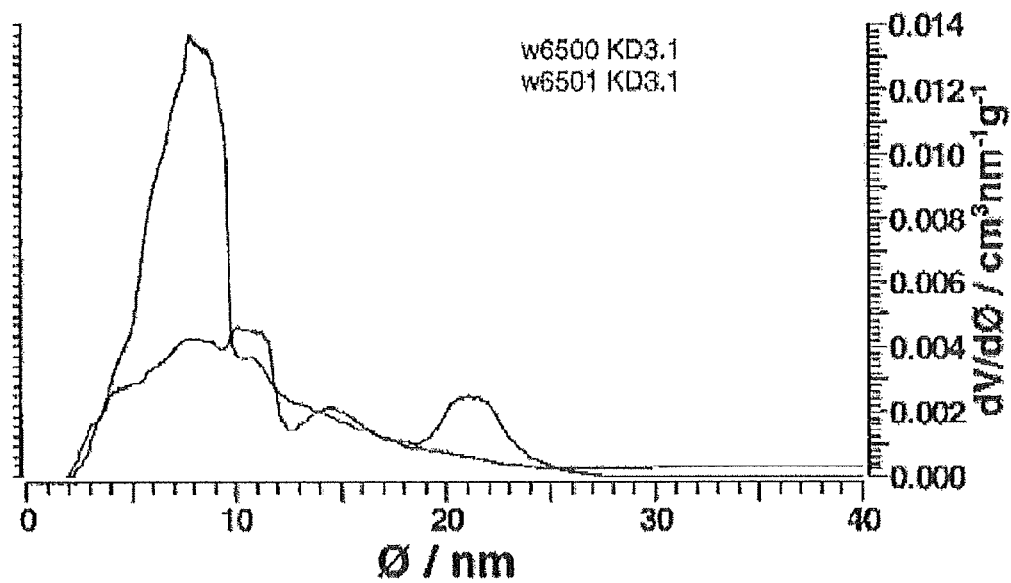
FIG. 14 shows pore size distribution of support with and without coarse particles.

In FIG. 14 is shown measuring results of support. In wc500 is a conventional support having median particle size 1.4 µm and median pore size is 8 nm. In wc501 support comprises coarse particles and median pore size is 3.0 µm and median pore size is over 10 nm.

The reduction of particles with a substrate according to the invention were 33% and 37% and with prior art substrate the reductions was 12%. The results are surprisingly high and clearly demonstrate the efficiency of the invented mesh sheet(s) and substrate having that mesh sheet(s). Nox-reductions were also very high with catalysts according to the invention (9%, 16%) compared to the prior art catalyst (4%). CO-reductions and THC-reductions were at same level with all catalysts. This shows that the catalyst according to the invention in addition to particle reduction also efficiently reduce components of exhaust gases. This combination makes them very preferably in treating exhaust gases of combustion engines.

The invention claimed is:

1. A metal substrate having open channels for treating exhaust gases of combustion engines, said substrate comprising corrugated porous sheets, wherein said porous sheet is a mesh sheet having mesh size from 30 to 300 having wires and openings, and that said wires of said porous sheet have been covered, and said openings of said porous sheet have been only partially filled by a support having the median pore size of pores from 10 to 50 nm and having the median particles size over 1.4 µm and having the area mass of said support from 20 to 200 g/m2 and the BET specific surface area of said support is from 30 to 300 m2/g and said support additionally comprises catalytically active material, and that said metal substrate additionally comprises open channels with both sizes of said porous sheet.

2. A metal substrate according to claim 1, wherein the median particle size support is from 1.5 to 3.5 µm.

3. A metal substrate according to claim 1, wherein said support comprises catalytically inert particles having median particle size from 10 to 200 µm.

4. A metal substrate according to claim 1, wherein said support comprises catalytically inert coarse alumina-, silica, zirconia-, ceria- or/and titania-particles.

5. A metal substrate according to claim 1, wherein at least part of support has been milled.

6. A metal substrate according to claim 1, wherein said support comprises fibres, which are projecting out from the plane of said support.

7. A metal substrate according to claim 1, comprising at least one other sheet selected from smooth, perforated, mesh, wire mesh and fibrous sheets.

8. A metal substrate according to claim 7, wherein said other sheet is a flat sheet.

9. A method for manufacturing a metal substrate comprising corrugated porous sheets for treating exhaust gases of combustion engines in open channels, wherein said porous sheet is a mesh sheet having mesh size from 30 to 300 having wires and openings, and that said wires of said porous sheet are covered and said openings of said mesh sheet are only partially filled by a support having the median pore size of pores from 10 to 50 nm and having the median particles size over 1.4 µm and having the area mass of said support from 20 to 200 g/m2 and the BET specific surface area of said support is from 30 to 300 m2/g and wherein said support additionally comprises catalytically active material, and that there are open channels with both sizes of said porous sheet.

10. A method for treating exhaust gases of combustion engines, wherein a metal substrate according to claim 1 is used to purify impurity particles from exhaust gases of combustion engines.

11. A method for treating exhaust gases of combustion engines by a metal substrate having open channels, wherein a substrate according to claim 1 is used to purify impurity particles of exhaust gases of combustion engines.

* * * * *